United States Patent
Kreye et al.

(10) Patent No.: US 10,913,339 B2
(45) Date of Patent: Feb. 9, 2021

(54) WINDOW PANE ARRANGEMENT, IN PARTICULAR VEHICLE BODY WINDOW PANE ARRANGEMENT

(71) Applicant: HENNIGES AUTOMOTIVE GMBH & CO. KG, Rehburg-Loccum (DE)

(72) Inventors: Bernhard Kreye, Rehburg-Loccum (DE); Sascha Winter, Rehburg-Loccum (DE)

(73) Assignee: HENNIGES AUTOMOTIVE GMBH & CO. KG, Rehburg-Loccum (DE)

( * ) Notice: Subject to any disclaimer, the term of this patent is extended or adjusted under 35 U.S.C. 154(b) by 0 days.

(21) Appl. No.: 15/770,703

(22) PCT Filed: Oct. 28, 2016

(86) PCT No.: PCT/EP2016/076055
§ 371 (c)(1),
(2) Date: Apr. 24, 2018

(87) PCT Pub. No.: WO2017/072288
PCT Pub. Date: May 4, 2017

(65) Prior Publication Data
US 2019/0061502 A1    Feb. 28, 2019

(30) Foreign Application Priority Data
Oct. 29, 2015  (DE) .................. 10 2015 013 974

(51) Int. Cl.
*B60J 10/78* (2016.01)
*B60J 1/10* (2006.01)
(Continued)

(52) U.S. Cl.
CPC ............... *B60J 10/78* (2016.02); *B60J 1/10* (2013.01); *B60J 10/16* (2016.02); *B60J 10/27* (2016.02); *B60J 10/70* (2016.02)

(58) Field of Classification Search
CPC ... B60J 10/70; B60J 10/27; B60J 10/78; B60J 1/10; B60J 10/16; B60J 1/08; B60J 10/34;
(Continued)

(56) References Cited

U.S. PATENT DOCUMENTS 4,163,076 A    7/1979  Katoh
4,756,944 A    7/1988  Kisanuki
(Continued)

FOREIGN PATENT DOCUMENTS

CA    2527223 A1  *  12/2004  ............ B29C 48/30
CN    1274322 A       11/2000
(Continued)

OTHER PUBLICATIONS

International Search Report for Application No. PCT/EP2016/076055 dated Feb. 14, 2017, 5 pages.
(Continued)

*Primary Examiner* — Jessie T Fonseca
(74) *Attorney, Agent, or Firm* — Howard & Howard Attorneys PLLC

(57) ABSTRACT

The invention relates to a window pane arrangement, especially a vehicle body window pane arrangement, including at least one pane of glass, and a profiled frame component surrounding the pane of glass, which is applied to one side of the pane of glass, on the edge of the pane. According to the invention, the profiled frame component includes a plurality of layers, a layer applied to the pane of glass being made of a hard material and at least one other layer being made of a soft material, and the profiled frame component includes, in the layer thereof made of a hard material, contact elements which can be brought into contact with the pane of glass and have application surfaces for an adhesive,
(Continued)

Figure 1:
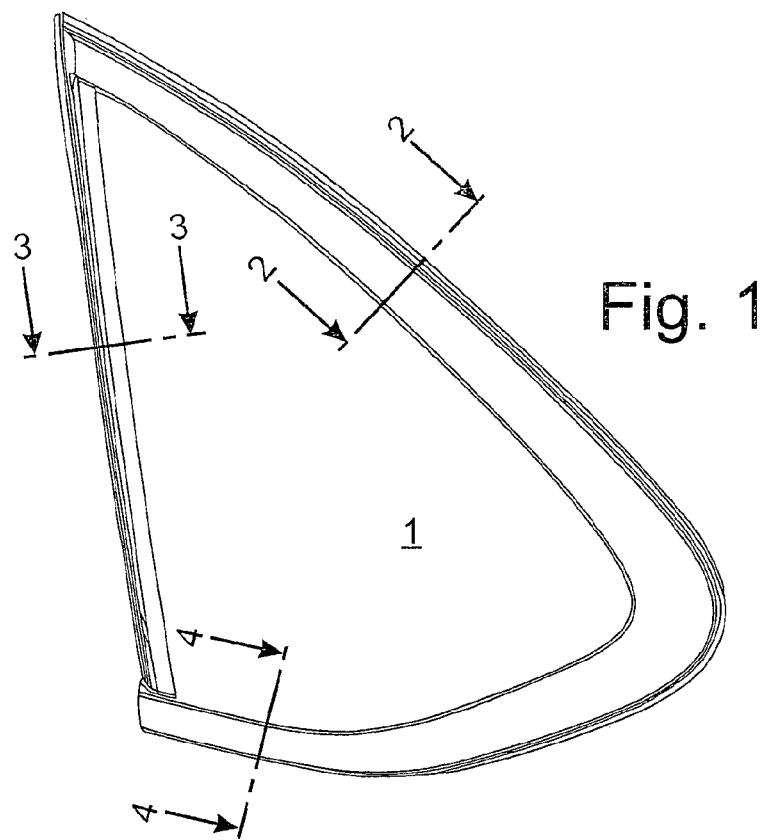

and, in the layer thereof made of soft material, projections projecting over the layer of hard material.

21 Claims, 2 Drawing Sheets

(51) Int. Cl.
*B60J 10/16* (2016.01)
*B60J 10/27* (2016.01)
*B60J 10/70* (2016.01)

(58) Field of Classification Search
CPC ....... B60J 10/345; B60J 10/30; E06B 3/5409; E06B 2003/6244; E06B 3/58; E06B 3/62
See application file for complete search history.

(56) References Cited

U.S. PATENT DOCUMENTS

| | | | |
|---|---|---|---|
| 4,768,319 A | 9/1988 | Derner | |
| 4,833,847 A | 5/1989 | Inayama et al. | |
| 5,032,444 A | 7/1991 | Desir, Sr. | |
| 5,035,096 A | 7/1991 | Ohtake et al. | |
| 5,305,553 A * | 4/1994 | Shimizu | B60J 10/24 49/490.1 |
| 5,311,711 A | 5/1994 | Desir, Sr. | |
| 5,358,764 A * | 10/1994 | Roberts | B60R 13/04 428/31 |
| 5,396,746 A | 3/1995 | Whitmer | |
| 5,403,632 A * | 4/1995 | Mesnel | B60J 10/15 428/122 |
| 5,626,383 A * | 5/1997 | Lee | B60J 10/24 296/146.9 |
| 5,743,047 A | 4/1998 | Bonne et al. | |
| 5,803,527 A | 9/1998 | Fujiya | |
| 5,807,639 A * | 9/1998 | Frappier | B29C 45/1657 428/475.5 |
| 6,103,168 A | 8/2000 | Kelly | |
| 6,106,047 A * | 8/2000 | Nagahashi | B60J 10/22 296/93 |
| 6,227,598 B1 | 5/2001 | Ichioka et al. | |
| 6,273,983 B1 | 8/2001 | Miyakawa et al. | |
| 6,382,696 B1 | 5/2002 | Young | |
| 6,460,300 B2 | 10/2002 | Mikkaichi et al. | |
| 6,546,683 B1 | 4/2003 | Senge | |
| 6,740,390 B2 | 5/2004 | Randazzo | |
| 6,810,635 B2 | 11/2004 | Meizlish | |
| 6,883,847 B2 | 4/2005 | Willett | |
| 7,059,656 B2 | 6/2006 | Mikkaichi et al. | |
| 7,591,117 B2 | 9/2009 | Kiriakou | |
| 7,685,777 B2 * | 3/2010 | Nozaki | B60J 10/24 49/490.1 |
| 8,925,265 B2 | 1/2015 | Bennett | |
| 9,156,338 B2 | 10/2015 | Watou et al. | |
| 9,475,372 B2 | 10/2016 | Doniga-Crivat et al. | |
| 2001/0003233 A1 | 6/2001 | Mikkaichi et al. | |
| 2006/0179786 A1 | 8/2006 | Kreye | |
| 2007/0246967 A1* | 10/2007 | Lynam | B60J 5/0404 296/146.1 |
| 2008/0110102 A1* | 5/2008 | Hotta | B60J 10/16 49/498.1 |
| 2008/0238134 A1 | 10/2008 | Guellec | |
| 2009/0064592 A1 | 3/2009 | Takase et al. | |
| 2011/0109009 A1 | 5/2011 | Guellec | |
| 2011/0121594 A1 | 5/2011 | Kreye et al. | |
| 2012/0256447 A1* | 10/2012 | Majer | B60J 10/70 296/201 |
| 2014/0311040 A1* | 10/2014 | One | B60J 10/33 49/490.1 |
| 2018/0222300 A1 | 8/2018 | Kreye | |
| 2019/0061502 A1 | 2/2019 | Kreye et al. | |

FOREIGN PATENT DOCUMENTS

| | | | |
|---|---|---|---|
| CN | 105050843 A | 11/2015 | |
| DE | 3046457 A1 | 7/1982 | |
| DE | 3333672 A1 | 4/1985 | |
| DE | 4228881 A1 | 3/1994 | |
| DE | 102010056495 A1 | 7/2012 | |
| DE | 202011000804 U1 | 7/2012 | |
| DE | 202011000804 U1 * | 7/2012 | ............. B60J 10/16 |
| DE | 102011050752 A1 | 12/2012 | |
| DE | 102013003243 A1 | 8/2014 | |
| DE | 202013103364 U1 | 10/2014 | |
| DE | 102015007294 B3 | 8/2016 | |
| DE | 102015010073 B3 | 11/2016 | |
| EP | 0201384 A2 | 11/1986 | |
| EP | 0268815 A2 | 6/1988 | |
| EP | 0885762 A1 | 12/1998 | |
| EP | 2103470 A1 | 9/2009 | |
| EP | 2110279 A2 | 10/2009 | |
| EP | 2740620 A1 | 6/2014 | |
| FR | 2952144 A1 | 5/2011 | |
| FR | 2965220 A1 | 3/2012 | |
| WO | 2006010352 A1 | 2/2006 | |
| WO | WO-2009/001910 A1 | 12/2008 | |
| WO | WO-2011/021021 A1 | 2/2011 | |
| WO | 2017020884 A1 | 2/2017 | |
| WO | 2017072288 A1 | 5/2017 | |

OTHER PUBLICATIONS

International Search Report for Application No. PCT/DE2016/000299 dated Jan. 2, 2017, 4 pages.
English language abstract for DE 30 46 457 A1 extracted from espacenet.com database on Feb. 28, 2020, 1 page.
English language abstract for DE 33 33 672 A1 extracted from espacenet.com database on Feb. 28, 2020, 1 page.
English language abstract for DE 10 2010 056 495 A1 extracted from espacenet.com database on Feb. 28, 2020, 2 pages.
English language abstract for DE 20 2011 000 804 U1 extracted from espacenet.com database on Feb. 28, 2020, 2 pages.
English language abstract for DE 10 2011 050 752 A1 extracted from espacenet.com database on Feb. 28, 2020, 1 page.
Machine-assisted English language abstract for DE 20 2013 103 364 U1 extracted from espacenet.com database on Feb. 28, 2020, 2 pages.
Machine-assisted English language abstract for DE 10 2015 007 294 B3 extracted from espacenet.com database on Feb. 28, 2020, 2 pages.
English language abstract for DE 10 2015 010 073 extracted from espacenet.com database on Feb. 28, 2020, 1 page.
English language abstract for EP 0 268 815 A2 extracted from espacenet.com database on Feb. 28, 2020, 1 page.
English language abstract for EP 2 110 279 A2 extracted from espacenet.com database on Feb. 28, 2020, 2 pages.
English language abstract for WO 2017/020884 A1 extracted from espacenet.com database on Feb. 28, 2020, 1 page.
English language abstract for WO 2017/072288 A1 extracted from espacenet.com database on Feb. 28, 2020, 2 pages.
English language abstract for CN 1274322 A extracted from espacenet.com database on Aug. 17, 2020, 1 page.
English language abstract for CN 105050843 A extracted from espacenet.com database on Aug. 17, 2020, 2 pages.
English language abstract for WO 2006/010352 A1 extracted from espacenet.com database on Aug. 17, 2020, 1 page.

* cited by examiner

WINDOW PANE ARRANGEMENT, IN PARTICULAR VEHICLE BODY WINDOW PANE ARRANGEMENT

The invention relates to a window pane arrangement, in particular to a vehicle body window pane arrangement, comprising at least one pane of glass, as well as to a profiled frame component that surrounds the edges of the pane of glass and is applied to one side of the pane of glass on the edge of the pane.

Window pane arrangements of the aforementioned type are installed for many purposes. For example, such window pane arrangements are built into the vehicle bodies of motor vehicles. The profiled frame components serve to connect the pane of glass and vehicle body components.

Various technologies have been proposed in prior art for allocating profiled frame components to a pane of glass. Profiled frame components can be applied to the edge of a pane of glass and joined with the pane of glass. This makes it possible to move profiled frame components closer from both sides of the pane of glass, bring them into contact with the respective edge of the pane of glass, and adhesively bond them to the pane of glass while in this contact. Known as well is to injection mold profiled frame components onto a pane of glass or use profiled frame components extruded directly onto the pane of glass.

The object of the invention is to indicate a window pane arrangement of the kind mentioned at the outset that makes it easier to install panes of glass, for example in a motor vehicle body.

This object is achieved according to the invention by virtue of the fact that the profiled frame component consists of a plurality of layers, wherein a layer that can be applied to the pane of glass is made of a hard material, and at least one other layer is made of a soft material, that the profiled frame component, in its layer made of hard material, has contact elements that can be brought into contact with the pane of glass and have application surfaces for an adhesive, and, in its layer made of soft material, has projections that protrude over the layer of hard material.

The window pane arrangement according to the invention provides only one profiled frame component. The latter can be brought closer to the pane of glass and applied to its edge. According to the invention, the profiled frame profile has a plurality of layers. It has one layer made of hard material, which is used to apply it to one side of the pane of glass in the area of the edge. Contact elements are also provided in this hard layer. These contact elements of the hard layer of the profiled frame component are joined with the pane of glass. This makes it possible to arrange the profiled frame component on the pane of glass after it has been installed in other components, e.g., in a motor vehicle body, so that a gap between the edge of the pane and vehicle body flange can be covered.

According to the invention, the profiled frame component has another layer, and this other layer is made of a soft material. The second layer not only covers the first layer of the profiled frame component, according to the invention it has projections that protrude over the layer made of hard material. The protrusion over the hard layer allows the soft layer to come into contact with other components as well. For example, another component is the pane of glass, so that a projection of the soft layer protruding over the hard layer is brought into contact with the pane of glass, and can provide an offset for arising tolerances. In like manner, a projection of the layer made of soft material can protrude to such an extent as to come into contact with a flange of a motor vehicle body once the window pane arrangement according to the invention has reached its installation site. Tolerances in the area of the motor vehicle body present here can also be offset.

The projections made of soft material in contact with other components can preferably exert a pressure on the profiled frame component and pane of glass joined together by retaining elements, so that the profiled frame component is guided against the pane of glass. The pane of glass is usually fastened to the motor vehicle body by means of an adhesive.

The application surfaces of the contact elements are preferably flat in design. Such an application surface can be flatly applied to a pane of glass. Adhesive bonding then produces an undetachable connection between the profiled frame component and pane of glass.

The application surfaces for the adhesive are preferably arranged at free ends of the contact elements protruding from the hard material. For example, the contact elements are web-shaped in design, with the application surface for the adhesive located at the free end. In this further development, only a portion of the hard layer of the profiled frame component participates in forming the application surface for the adhesive.

It can here be provided that grooved recesses be introduced into the application surfaces. The adhesive can partially penetrate into such recesses, so as to become fixedly connected with the material of the hard layer. Removing material from the contact elements advantageously economizes on weight.

A further development of the invention can provide that the contact elements protruding from the hard material be designed as webs. The webs can have a circular cross section, wherein the webs can also be designed as hollow cylinders. The profiled frame component with the pane can be adhesively bonded at points or continuously, i.e., running around the peripheral edge of the pane.

In a further development of the invention, the projections of the layer made of soft material each have a lip structure. Such a lip structure can be in contact with another component, wherein the lip can be compressed and nonetheless retain its sealing contact. It is possible that a lip be designed to protrude roughly perpendicularly from the surfaced of the layer made of soft material, so as to bridge a greater gap between the window pane arrangement and, for example, an allocated vehicle body flange.

In a next further development of the invention, it is provided that the profiled frame component have a bow-shaped cross section, which has contact surfaces for contacting the pane of glass, and is covered by the layer made of soft material. The profiled frame component can thus rest on the pane of glass at points, and cover an adhesive bead on the other side of the pane of glass with its correspondingly designed width. In addition, covering the hard layer of the profiled frame component with the layer made of soft material yields pleasant haptics and appealing design possibilities for the profiled frame component. The bow shape of the profiled frame component envelops cavities. In this way, the profiled frame component can be fabricated in such a way as to economize on material, and thus on weight.

The profiled frame component can further be enhanced with a trim strip. This imparts a high-quality appearance to the window pane arrangement according to the invention.

From a production standpoint, it can here be provided that the layer made of soft material be sprayed onto the layer made of hard material. This makes for rational production, with both layers also being fixedly joined together.

For example, the hard layer of the profiled frame component is comprised of a hard plastic, such as PP, ABS or hard PVC. By contrast, the other layer of the profiled frame component is preferably made out of a soft plastic, such as TPE or soft PVC.

The adhesive for the hard component is advantageously an MS polymer. The MS polymer then does not require that the pane of glass be primed. The plastic material of the profiled frame component can be pretreated with flame or atmospheric plasma. Alternatively, an adhesive with 1K-PU or 2K-PU is also possible. The glass then does require pretreatment (priming). Also suitable is a hot melt (hot melt) adhesive. The two adhesives can also be used together. While the MS polymer hardens slowly, the hot melt ensures a secure grip until the MS polymer has completely solidified.

Panes of glass are usually adhesively bonded into a vehicle body. For purposes of fixation, clips are then often fastened to the interior side of the pane, and then ensure that the position of the pane is precisely aligned, and hold it in position until the adhesive has hardened. These clips can then be fastened with the same adhesive system as the frame component.

Figure 2:
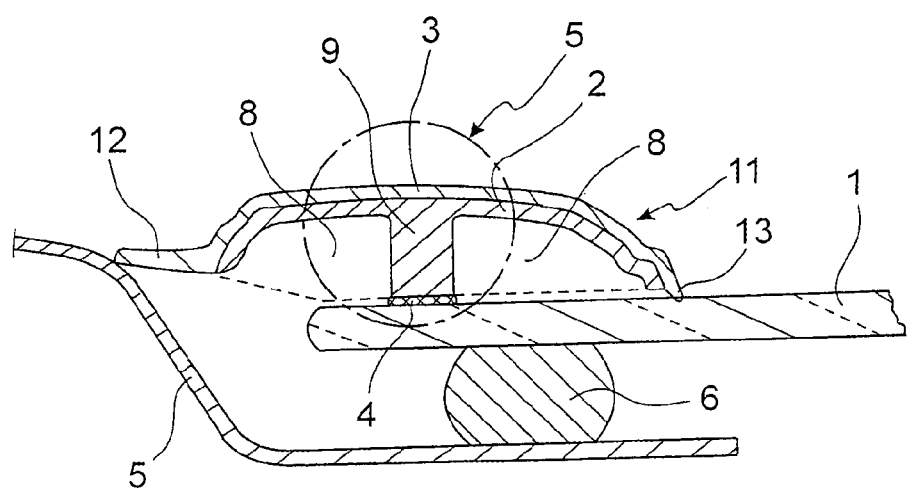
Figure 2A:
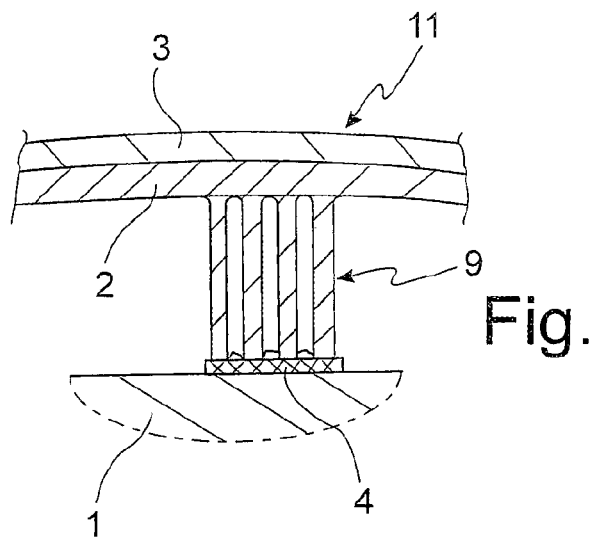
Figure 3:
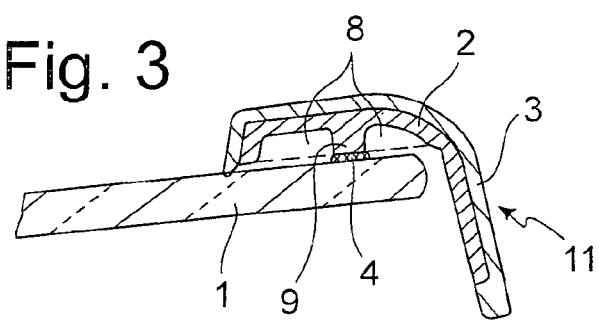
Figure 4:
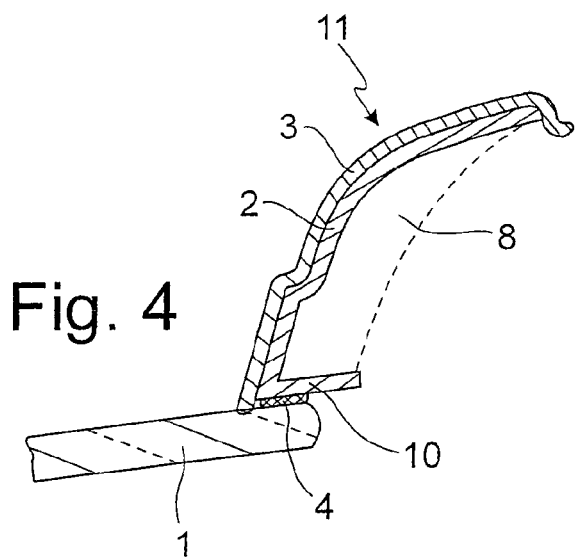

The drawing shows an exemplary embodiment, from which additional inventive features are derived. Shown on:

FIG. 1: is a side view of a pane of glass for a motor vehicle body,

FIG. 2: is a sectional view along the cutting line 2-2 on FIG. 1,

FIG. 2a: is a scaled-up partial view of the detail S on FIG. 2,

FIG. 3: is a sectional view along the cutting line 3-3 on FIG. 1, and FIG. 4: is a sectional view along the cutting line 4-4 on FIG. 1.

The pane of glass on FIG. 1 depicts two window pane arrangements according to the invention. The pane of glass 1 is provided for a rear side window of a motor vehicle, and is fixedly installed in a motor vehicle body. A flange 5 of a motor vehicle body is shown on FIG. 2.

FIG. 2 shows a window pane arrangement allocated to the pane of glass 1 on FIG. 1 via an arc measuring 180°. The sectional views on FIGS. 2a, 3 and 4 also show this window pane arrangement.

The window pane arrangement comprises a profiled frame component 11. The profiled frame component 11 consists of a layer 2 made of hard material, as well as of a layer 3 made of soft material. Both layers 2, 3 are rigidly joined together, for example by spraying the soft layer 3 onto the hard layer 2. The contact element 9 is designed as a web, wherein this web can have a circular cross section. Several webs can be arranged one directly next to the other, so as to yield multiple points at which the profiled frame component 11 is adhesively bonded to the pane of glass 1.

The hard layer 2 has a contact element 9 that can be retentively joined with the pane of glass 1. The contact element 9 is comprised of a projection provided by the hard layer 2, which is guided against the pane of glass 1 and joined with the latter by an adhesive 4. This contact element 9 joins the profiled frame component 11 with the pane of glass 1.

The soft layer 3 of the profiled frame component 11 completely covers the hard layer 2 of the profiled frame component 11. In addition, it has projections 12 and 13 that protrude over the hard layer 2. These projections 12, 13 protrude over the hard layer 2, and can be brought into contact with adjacent components. In this way, the projection 13 is guided against the pane of glass 1. This projection 13 seals the contact between the profiled frame component 11 and pane of glass 1 in this area. The other projection 12 protrudes from the surface of the profiled frame component 11, and forms a sealing lip that is guided against the vehicle body flange 5. This bridges and seals the distance between the edge of the pane of glass 1 and the allocated vehicle body flange 5.

The broad design of the projection 12 is also visible on FIG. 1.

FIG. 2a shows the design of the contact element 9 in detail. The latter has grooved recesses. These penetrate through the entire height of the contact element 9 designed as a projection. Sections of the adhesive 4 can protrude into these grooves.

As shown on FIG. 3, a window pane arrangement according to the invention is also allocated to the straight edge of the pane of glass 1 on FIG. 1. Here as well, a profiled frame component 11 with the inventive design is allocated to an edge of the pane of glass 1. The contact element 9 is again designed like a projection.

FIG. 4 has the contact element 10, which consists of an angulation of the layer 2 made of hard material.

The invention claimed is:

1. A vehicle body window pane arrangement, comprising:
   at least one pane of glass having edges and opposing sides; and
   a profiled frame component applied to one of the sides of the at least one pane of glass at one of the edges of the at least one pane of glass to form a cavity between the profiled frame component and the at least one pane of glass,
   wherein the profiled frame component has a plurality of layers with one of the plurality of layers being a first layer applied to the at least one pane of glass and made of a hard material, and another one of the plurality of layers being a second layer made of a soft material,
   wherein the first layer made of hard material has a body portion and contact elements projecting from the body portion with the contact elements brought into direct contact with the at least one pane of glass with the contact elements at least partially dividing the cavity,
   wherein the second layer made of soft material covers the first layer made of hard material and has projections that protrude over the first layer made of hard material.

2. The window pane arrangement according to claim 1, wherein the contact elements have application surfaces for an adhesive in order to secure the profiled frame component to the at least one pane of glass.

3. The window pane arrangement according to claim 2, wherein the application surfaces of the contact elements are flat.

4. The window pane arrangement according to claim 3, wherein the application surfaces are arranged at free ends of the contact elements protruding from the body portions.

5. The window pane arrangement according to claim 2, wherein the contact elements are webs.

6. The window pane arrangement according to claim 5, wherein the webs have a circular cross section.

7. The window pane arrangement according to claim 2, wherein the adhesive is an MS polymer or hot melt adhesive.

8. The window pane arrangement according to claim 1, wherein the projections of the second layer each have a lip structure.

9. The window pane arrangement according to claim 1, wherein the second layer made of soft material is sprayed onto the first layer made of hard material.

10. The window pane arrangement according to claim 1, wherein the first layer made of hard material comprises PP, ABS or hard PVC and the second layer made of soft material comprises TPE or soft PVC.

11. The window pane arrangement according to claim 1, wherein the body portion is curved when viewed in cross-section.

12. The window pane arrangement according to claim 1, wherein the contact elements extend transverse from the body portion.

13. The window pane arrangement according to claim 1, wherein the body portion of the first layer made of hard material is spaced from the at least one pane of glass.

14. The window pane arrangement according to claim 1, wherein the body portion has opposing inner and outer surfaces with the contact elements extending from the inner surface and the second layer covering the outer surface.

15. A vehicle body window pane arrangement, comprising:
- at least one pane of glass; and
- a profiled frame component that surrounds edges of the at least one pane of glass and is applied to one side of the at least one pane of glass at one of the edges of the at least one pane of glass,
- wherein the profiled frame component has a plurality of layers with one of the plurality of layers being a first layer applied to the at least one pane of glass and made of a hard material, and another one of the plurality of layers being a second layer made of a soft material,
- wherein the first layer made of hard material has a body portion and contact elements with the contact elements brought into contact with the at least one pane of glass and having application surfaces for an adhesive,
- wherein the second layer made of soft material has projections that protrude over the first layer made of hard material, and
- wherein the application surfaces are arranged at free ends of the contact elements protruding from the body portion.

16. The window pane arrangement according to claim 15, wherein the contact elements extend transverse from the body portion.

17. The window pane arrangement according to claim 15, wherein the body portion has opposing inner and outer surfaces with the contact elements extending from the inner surface and the second layer covering the outer surface.

18. The window pane arrangement according to claim 15, wherein the first layer made of hard material comprises PP, ABS or hard PVC and the second layer made of soft material comprises TPE or soft PVC.

19. The window pane arrangement according to claim 15, wherein the adhesive is an MS polymer or hot melt adhesive.

20. The window pane arrangement according to claim 15, wherein the application surfaces of the contact elements are flat.

21. The window pane arrangement according to claim 15, wherein grooved recesses are introduced into the application surfaces.

* * * * *